Aug. 27, 1940.                J. R. MARTIN                2,212,571
                                 UNION
                          Filed July 25, 1938
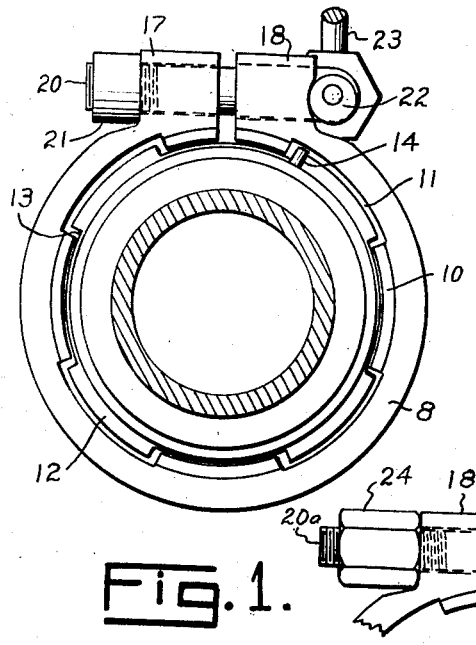
Fig.1.
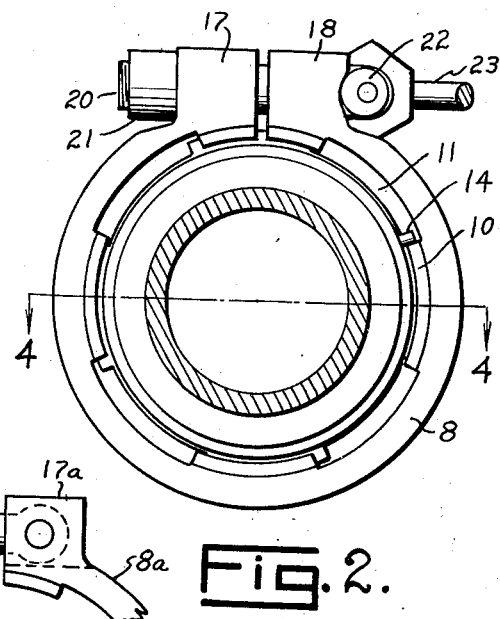
Fig.2.
Fig.5.
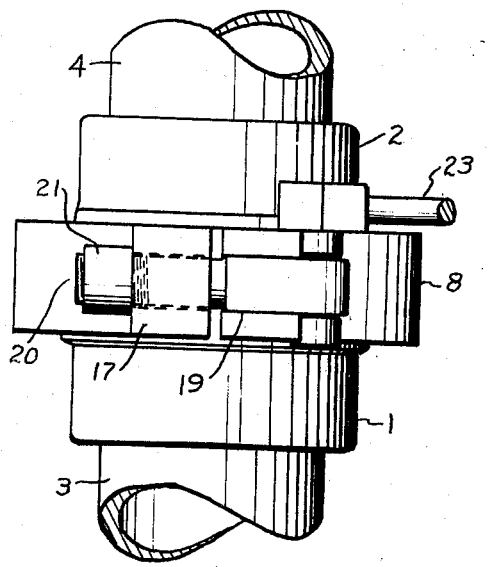
Fig.3.
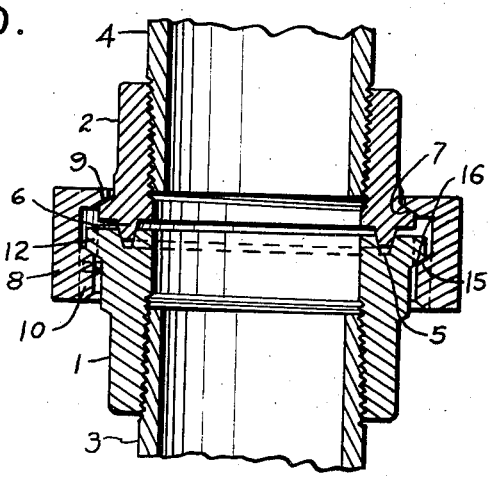
Fig.4.
Inventor
JOHN R. MARTIN
By
Edward V. Hardway
Attorney Patented Aug. 27, 1940

2,212,571

UNITED STATES PATENT OFFICE 2,212,571

UNION

John R. Martin, Houston, Tex., assignor to Arthur J. Penick and Kirby T. Penick, both of Houston, Tex.

Application July 25, 1938, Serial No. 221,085

6 Claims. (Cl. 285—177)

This invention relates to a union and has particular relation to that type of union specially designed for connecting sections of pipe so as to form a fluid tight joint between the connected sections.

It is another object of the invention to provide a coupling of the character described whereby the adjacent ends of the sections of pipe may be quickly connected and disconnected.

It is a further object of the invention to provide a union of the character described embodying adjacent coupling members and a surrounding clamp ring having novel means for assembling the clamp ring with the coupling members to be connected, the assembly embodying contacting, tapering faces which co-act to draw the coupling members tight together to form a fluid tight joint upon contraction of the clamp ring with means for contracting said clamp ring.

With the above and other objects in view the invention has particular relation to certain novel features of construction, operation and arrangement of parts, an example of which is given in this specification and illustrated in the accompanying drawing, wherein:

Figure 1 shows an end view of the union showing the clamp ring in position to permit the separation of the coupling members.

Figure 2 shows a similar view thereof showing the parts connected together.

Figure 3 shows a plan view of the union.

Figure 4 shows a sectional view taken on the line 4—4 of Figure 2, and

Figure 5 illustrates another embodiment of the clamp ring.

Referring now more particularly to the drawing wherein like numerals of reference designate the same parts in each of the figures, the numerals 1 and 2 designate tubular coupling members shown secured on the ends of the pipe sections 3, 4 to be connected. One of the coupling members, as 1 has an annular, inwardly tapering groove 5 to receive the annular seal rib 6 on the other coupling member. The free end of the coupling member 2 is outwardly thickened and formed with an annular tapering face 7 and surrounding said coupling member 2 there is a clamp ring 8 which is open at one side.

At one end the clamp ring has an inwardly extended annular flange formed with an inside, annular, tapering face 9 adapted to ride on the face 7. At its other end the clamp ring 8 is formed with the spaced, arcuate, internal ribs 10 which are spaced apart a uniform distance thus providing the elongated, arcuate notches 11 between said ribs 10. The inner end of the coupling member 1 is provided with the external, arcuate ribs 12 alternating with the intervening notches 13 as shown in Figures 1 and 2.

The clamp ring 8 may be assembled on the coupling member 2 and said coupling members 1 and 2 then brought into alignment with the rib 6 seated in the groove 5. The clamp ring 8 may then be turned until its notches 11 are in alignment with the ribs 12, as shown in Figure 1, and then moved longitudinally until its face 9 seats against the face 7, the ribs 10 and 12 passing through the corresponding notches 11, 13. The clamp ring 8 may then be turned thus carrying the ribs 10 into registration with the ribs 12 as shown in Figure 2. It will be stopped in this position by the engagement of one end of one of the ribs 12 with the external pin 14 on the coupling member 1.

The ribs 10 having the internal tapering faces 15 as shown in Figure 4 and the ribs 12 have the external tapering faces 16 which contact with the corresponding faces 15 when the parts are assembled in final position.

It is to be noted that the faces 7, 16 converge outwardly and similarly the faces 9, 15 converge outwardly. Accordingly, when the clamp ring 8 is contracted these cooperating faces will operate to draw the coupling members 1, 2 very securely together to prevent leakage.

As shown in Figures 1 to 4 the clamp ring 8, at its open side, has the outwardly turned lugs 17, 18, the lug 18 having a deep notch 19. A clamp bolt 20 is fitted through the lugs 17 and rests in the notch 19. One end of the bolt 20 has a nut 21 thereon which abuts the lug 17 and the other end of the clamp bolt 20 has the rotatable cams 22, 22 mounted thereon which may be turned by a handle 23. When these cams 22 are turned into the position shown in Figure 2 they operate against the corresponding arcuate side of the lug 18 so as to draw the lugs 17, 18 together and to cause the clamp ring 8 to be contracted to draw the coupling members 1, 2 firmly together. When the handle 23 is moved to another position, as shown in Figure 1, it will release, or expand, the clamp ring so as to permit it to be easily turned to move the ribs 10, 12 out of registration so that the parts may be readily separated.

As shown in Figure 5 the clamp ring 8a has the outwardly turned lugs 17a and 18a at its open side with the bolt 20a pivoted to the lug 17a and fitted through a bearing in the lug 18a. The free end of the bolt 20a is outwardly threaded to receive a clamp nut 24 for contracting or releasing the clamp ring 8a in an obvious manner.

The drawing and description disclose what is now considered to be preferred forms of the invention by way of illustration only, while the broad principle of the invention will be defined by the appended claims.

What I claim is:

1. A union comprising two tubular coupling members, one having an external, annular tapering face and the other having external, spaced ribs provided with tapering faces, a clamp ring around said coupling members having an internal, tapering face cooperating with said annular, tapering face and having internal ribs shaped to interlock with the ribs of said coupling member, said ribs having cooperating tapering faces, all of said faces tapering only toward the axis of the coupling and means for contracting said clamp ring.

2. A union comprising two coupling members, one having an external, annular tapering face and the other having external spaced ribs, or lugs, a unitary split clamp ring having an internal, annular face engageable with said external, annular face and having inside ribs arranged to pass between the ribs of the coupling member upon longitudinal movement of the clamp ring relative thereto, said clamp ring being turnable to move the ribs thereof into registration with the ribs of said coupling member, said registering ribs having contacting, flared faces, means for contracting said clamp ring to cause said co-acting faces to draw the coupling members together.

3. A union comprising two coupling members, one having an external, annular tapering face and the other having external spaced ribs, or lugs, a clamp ring having an internal, annular face engageable with said external, annular face and having inside ribs arranged to pass between the ribs of the coupling member upon longitudinal movement of the clamp ring relative thereto, said clamp ring being turnable to move the ribs thereof into registration with the ribs of said coupling member, said registering ribs having contacting faces which taper toward the axis of the coupling, means for contracting said clamp ring to cause said co-acting faces to draw the coupling members together, a stop on one of said coupling members engageable with the opposing end of a rib of the clamp ring to limit the turning movement of said ring.

4. A union comprising two coupling members, one having an external, annular face which tapers toward the coupling axis and the other having external, spaced ribs provided with external faces which taper toward said axis, a clamp ring around said coupling members having an internal, annular face which tapers toward said axis and cooperates with said external, annular tapering face and having internal ribs shaped to be interlocked with said ribs of said coupling members, said ribs having faces which taper toward said axis and which cooperate when said ribs are so interlocked and means for contracting said clamp ring to cause said tapering faces to co-act to draw the coupling members together.

5. A union comprising two tubular coupling members, one having an external, annular, tapering face and the other having external spaced ribs provided with tapering faces, an open clamp ring around said coupling members having an internal, annular, tapering face cooperating with said external, annular, tapering face and having internal ribs shaped to interlock with the ribs of said coupling member, said internal ribs having tapering faces which cooperate with the tapering faces of the external ribs, outwardly turned lugs on the free ends of the clamp ring, a clamp bolt fitted through one of said lugs, the other of said lugs having a deep notch to receive the clamp bolt, rotatable cams mounted on the clamp bolt and operative, upon turning thereof in one direction, against the outer side of the notched lug to contract the clamp bolt and into released position, upon turning thereof in the other direction, to permit the clamp bolt to expand.

6. A union comprising internally threaded coupling members arranged with their ends in opposing relationship, a tapering rib on the contacting end of one of said coupling members, the other member having a groove cooperating with said rib to form a seal between the members, one of said members having an external annular tapering face, external spaced ribs on the other of said members, a unitary substantially rigid split clamp ring having an internal annular face engageable with said external annular face of one of the coupling members, inside ribs in said clamp ring, the external spaced ribs of the coupling members being adapted to pass between the said inside ribs of the clamp ring and movable into interlocking relation therewith, means for contracting said clamp ring to cause the coacting tapering faces to draw the coupling members together.

JOHN R. MARTIN.